(No Model.)

W. V. HIRSH.
SPLIT RUBBER WHEEL.

No. 536,696. Patented Apr. 2, 1895.

Witnesses:
John Becker.
William Schulz.

Inventor:
William V. Hirsh
by his attorneys
Roeder & Briesen

UNITED STATES PATENT OFFICE.

WILLIAM V. HIRSH, OF BROOKLYN, NEW YORK.

SPLIT RUBBER WHEEL.

SPECIFICATION forming part of Letters Patent No. 536,696, dated April 2, 1895.

Application filed December 31, 1894. Serial No. 533,373. (No model.)

*To all whom it may concern:*

Be it known that I, WILLIAM V. HIRSH, of Brooklyn, Kings county, New York, have invented an Improved Split Rubber Wheel for Barrel-Scrubbing Machines, of which the following is a specification.

This invention relates to a rubber wheel or disk more particularly designed for supporting and revolving barrels while they are being subjected to the action of the brushes of a barrel scrubbing machine.

The object of the invention is to so construct a split rubber wheel, that it may be readily fitted around the shaft, and that the connection between the two wheel sections is such, that it will not interfere with, or be interfered with, by the ordinary peripheral wear of the wheel.

Figure 1:
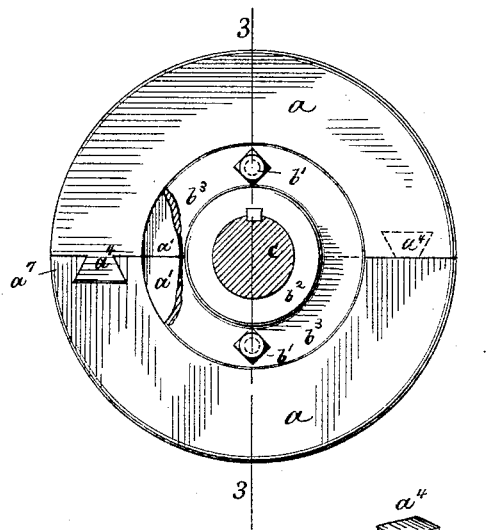
Figure 2:
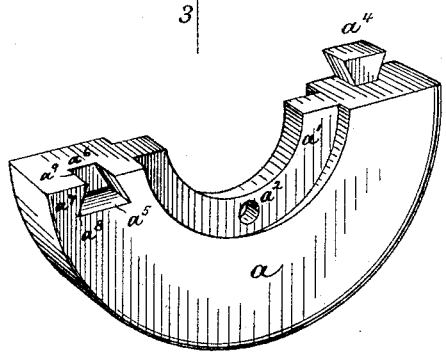
Figure 3:
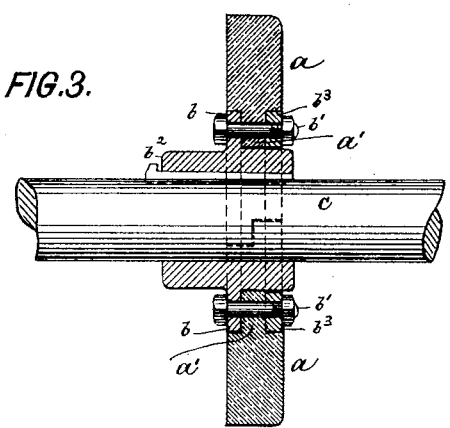

In the accompanying drawings Figure 1, is an elevation, partly in section, of my improved rubber wheel. Fig. 2, is a perspective view of one half the wheel, and Fig. 3, a cross section on line 3, 3, Fig. 1.

The wheel is composed of two semicircular interlocking halves or sections $a, a$, made of the same configuration and composed entirely of soft rubber. At the center, each section $a$, is reduced to form a segmental flange $a'$, that constitutes a seat for the flange $b$, of the hub $b^2$, and also for an annulus $b^3$, that surrounds the hub at the opposite side of the flange $a'$. The flange $b$, is connected to the annulus $b^3$, by bolts $b'$, that pass through perforations $a^2$, of flange $a'$. The hub $b^2$ passes through the central bore of the wheel and is adapted for the reception of the shaft $c$, upon which the wheel is mounted. At their contiguous edges, the sections $a$, are provided at one end with a dovetail tenon $a^4$, and at the other end with a corresponding dovetail mortise $a^5$. The tenon is of about one half the thickness of the wheel, and the mortise extends also through but one half the thickness of the wheel, so as to leave a solid portion beyond its base $a^6$, (Fig. 2.) When the two sections $a$, are put together, the tenon of one section will engage the mortise of the other section, and thus the sections are properly interlocked.

As the surface of the wheel wears, the outer flange $a^7$, of the mortise $a^5$, is, of course, gradually reduced, and were it made of the same depth as the mortise, it would drop off, as soon as the wear would reach the outer angle $a^8$, of the mortise; but as the flange $a^7$, is integral with the solid section of the wheel, beyond the base $a^6$, it can be worn down to its extreme inner point $a^9$, without releasing the tenon $a^4$. Thus it will be seen, that a practical joint is formed between the two wheel sections that permits the sections to be readily fitted around the shaft $c$, and which at the same time permits the wheel to wear down uniformly and up to the extreme edge of the joint.

What I claim is—

The combination of semi-annular rubber sections $a$, having reduced flanges $a'$, and interlocking dovetail tenons and mortises, with a flanged hub, an annulus and bolts that connect the hub flange to the annulus, substantially as specified.

WILLIAM V. HIRSH.

Witnesses:
F. V. BRIESEN,
WILLIAM SCHULZ.